United States Patent
Isogai

(10) Patent No.: US 9,388,821 B2
(45) Date of Patent: Jul. 12, 2016

(54) COMPRESSOR HOUSING AND EXHAUST TURBINE SUPERCHARGER

(75) Inventor: Tomoyuki Isogai, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 367 days.

(21) Appl. No.: 14/113,293

(22) PCT Filed: Jul. 25, 2011

(86) PCT No.: PCT/JP2011/066875
§ 371 (c)(1),
(2), (4) Date: Oct. 22, 2013

(87) PCT Pub. No.: WO2013/014743
PCT Pub. Date: Jan. 31, 2013

(65) Prior Publication Data
US 2014/0147256 A1    May 29, 2014

(51) Int. Cl.
F04D 29/16    (2006.01)
F01D 25/24    (2006.01)
F02B 33/02    (2006.01)
F02C 6/12    (2006.01)

(52) U.S. Cl.
CPC ............. *F04D 29/162* (2013.01); *F01D 25/24* (2013.01); *F02B 33/02* (2013.01); *F02C 6/12* (2013.01); *F05D 2220/40* (2013.01); *F05D 2240/11* (2013.01)

(58) Field of Classification Search
CPC ....... F01D 25/24; F01D 11/12; F01D 11/122; F02B 33/40; F02C 6/12; F04D 29/122; F04D 29/162; F04D 29/403; F04D 29/4206; F04D 29/624

USPC ................................. 415/173.4, 173.1, 173.5
See application file for complete search history.

(56) References Cited

U.S. PATENT DOCUMENTS 6,193,463 B1 * 2/2001 Adeff ................... F04D 29/023
                                                                    415/196

FOREIGN PATENT DOCUMENTS

| JP | A-10-331653 | 12/1998 |
| JP | A-11-173153 | 6/1999 |
| JP | A-2000-205199 | 7/2000 |
| JP | B2-3153378 | 4/2001 |
| JP | A-2004-162578 | 6/2004 |
| JP | 2005140001 A * | 6/2005 |
| JP | A-2005-140001 | 6/2005 |
| WO | WO 98/48157 A1 | 10/1998 |

* cited by examiner

*Primary Examiner* — Christopher Verdier
*Assistant Examiner* — Juan G Flores
(74) *Attorney, Agent, or Firm* — Oliff PLC

(57) ABSTRACT

A compressor housing is provided with a shroud member, which surrounds a compressor impeller, and a sealing member. The shroud member has a facing surface that is located at a position on a radially outside of the compressor impeller on an inner circumferential surface of the shroud member. The sealing member is provided on the facing surface. The sealing member is formed from a cylindrical material that has free-cutting property to the compressor impeller. The sealing member is press-fitted into the facing surface of the shroud member.

8 Claims, 2 Drawing Sheets

Figure 1:
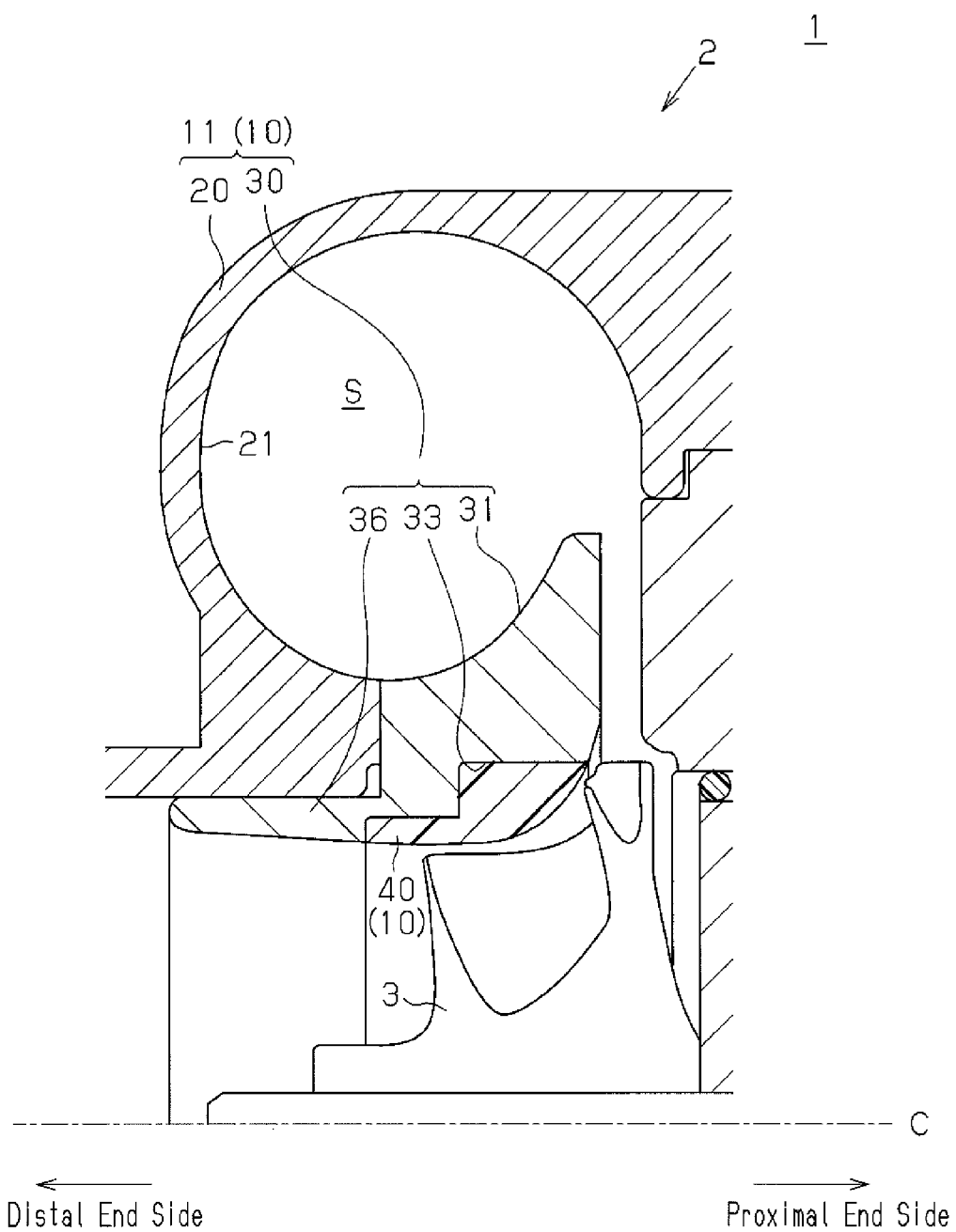

Distal End Side ← → Proximal End Side

COMPRESSOR HOUSING AND EXHAUST TURBINE SUPERCHARGER

FIELD OF THE DISCLOSURE

The present invention relates to an exhaust turbine supercharger that performs supercharging by rotating a compressor impeller using the energy of exhaust gas, and a compressor housing that surrounds the compressor impeller.

BACKGROUND OF THE DISCLOSURE

Conventionally, as this kind of compressor impeller and an exhaust turbine supercharger, for example, there have been a compressor impeller and an exhaust turbine supercharger (hereinafter, referred to as a supercharger) described in Patent Document 1.

The compressor housing of the supercharger described in Patent Document 1 includes a housing body (9) that surrounds a compressor impeller (8). The housing body (9) has a facing surface (14) that is located radially outside of a blade (13A) of the compressor impeller (8) in the housing main body (9) and faces the blade (13A). A sealing member (15) having a substantially cylindrical shape and formed of a plastic material having a free-cutting property to the compressor impeller (8), which is also referred to as an abradable seal is provided on the facing surface (14).

A groove (15a) is formed over the entire circumference on the outer circumferential surface of the sealing member (15). Also, a recessed portion (14a) is formed over the entire circumference on the facing surface (14) facing the grooves (15a).

At the time of assembling the sealing member (15) to the housing main body (9), by inserting the sealing member (15) into the inner circumference of the facing surface (14) of the housing main body (9) in a state where a snap ring (22) is fitted to the groove (15a), the snap ring (22) is fitted to both the groove (15a) and the recessed portion (14a). In this way, the sealing member (15) is assembled to the facing surface (14) via the snap ring (22), so that the sealing member is less likely to escape the housing main body (9).

Furthermore, conventionally, there has been a technique of forming the sealing member on the facing surface of the housing main body by thermal spraying, and a technique of forming the sealing member by injection molding.

PRIOR ART DOCUMENTS

Patent Documents

Patent Document 1: Japanese Laid-Open Patent Publication No. 11-173153

SUMMARY OF THE INVENTION

Problems that the Invention is to Solve

However, in the case of an attaching structure of the sealing member described in Patent Document 1, a snap ring or the like is additionally required for assembling the sealing member with the facing surface of the housing main body.

Furthermore, in the case of forming a sealing member on the facing surface of the housing main body by the thermal spraying or in the case of forming a sealing member by the injection molding, since a high-temperature material is directly poured into the facing surface, the housing main body is heated, and thus there is a risk of an occurrence of thermal distortion.

Accordingly, it is an objective of the present invention to provide a compressor housing and an exhaust turbine supercharger capable of accurately attaching the sealing member to a facing surface of a housing body, without causing a thermal distortion in the housing main body and without depending on another member.

Means for Solving the Problems

Means for achieving the above objective and advantages thereof will now be discussed.

To achieve the foregoing objective and in accordance with one aspect of the present invention, a compressor housing is provided that includes a housing main body and a cylindrical sealing member. The housing main body surrounds a compressor impeller. The housing member has a facing surface that is located at a position on a radially outside of the compressor impeller on an inner circumferential surface of the housing main body and faces the compressor impeller. The cylindrical sealing member is arranged on the facing surface and is formed by a material having a free-cutting property to the compressor impeller. The sealing member is press-fitted into the facing surface of the housing main body.

According to such a configuration, since the sealing member is assembled by being press-fitted into the facing surface of the housing main body, it is possible to attach the sealing member to the housing main body without depending on another member such as a snap ring. Furthermore, unlike the case of forming the sealing member on the facing surface by the thermal spraying or the case of forming the sealing member by the injection molding, it is possible to provide the sealing member without heating the housing main body. Therefore, it is possible to accurately attach the sealing member to the facing surface of the housing main body, without causing a thermal distortion in the housing main body and without depending on another member.

In this case, a protruding portion or a recessed is preferably formed on the outer circumferential surface of the sealing member, and a recessed portion or a protruding portion, with which the protruding portion or the recessed portion of the sealing member is fitted, is preferably formed on the facing surface of the housing main body.

According to such a configuration, a protruding portion or a recessed portion formed on the outer circumferential surface of the sealing member, and a recessed portion or a protruding portion facing the protruding portion or the recessed portion on the facing surface of the housing main body are fitted to each other. Thus, even when the pressing state between the facing surface of the housing main body and the sealing member is relaxed, it is possible to prevent the sealing member from escaping the facing surface of the housing main body.

In this case, the protruding portion or the recessed portion of the sealing member is preferably located on a leading side in a press-fitting direction of the sealing member relative to a pressing portion that is pressed against the facing surface of the housing main body in a radial direction of the sealing member.

According to such a configuration, between the outer circumferential surface of the sealing member and the facing surface of the housing main body, the trailing sides in a press-fitting direction relative to a fitting position of the protruding portion or the recessed portion of the sealing member and the recessed portion or protruding portion of the housing main body are sealed by respective pressing portions. For this reason, it is possible to reliably suppress water or the like from entering the fitting position from the trailing side in the press-fitting direction of the sealing member.

A position-determining portion configured to determine a position of the sealing member in the press-fitting direction of the sealing member is preferably formed on the facing surface of the housing main body.

According to such a configuration, when the sealing member is press-fitted to the facing surface of the housing main body, the displacement to the leading side in the press-fitting direction of the sealing member is limited by a position-determining portion formed on the facing surface. It is therefore possible to easily and accurately determine the position of the sealing member relative to the facing surface.

In this case, the position-determining portion is preferably a stepped portion. Also, the stepped portion is preferably formed by projecting, radially inwardly, a part of the facing surface of the housing main body that is located on the leading side in the press-fitting direction of the sealing member relative to the pressing portion of the sealing member.

According to such a configuration, displacement to the leading side in the press-fitting direction of the sealing member is limited by the abutment of the sealing member against the stepped portion formed on the facing surface of the housing main body. Moreover, since the stepped portion and the sealing member abut against each other, it is possible to reliably suppress water or the like from entering between the facing surface and the outer circumferential surface of the sealing member through between these portions.

In these cases, on the facing surface of the housing main body, preferably only the position-determining portion comes into contact with the sealing member in the axial direction of the sealing member.

According to such a configuration, when the sealing member is press-fitted to the facing surface of the housing main body, parts other than the position-determining portion and the press-fitting portion in the axial direction of the sealing member do not interfere with the sealing member. It is therefore possible to accurately perform the press-fitting and the position-determining of the sealing member.

On the facing surface of the housing main body, preferably only the pressing portion to be pressed against the facing surface in the radial direction of the sealing member comes into contact with the sealing member in the radial direction of the sealing member.

According to such a configuration, when the sealing member is press-fitted to the facing surface of the housing main body, the parts other than the pressing portion in the radial direction of the sealing member do not interfere with the sealing member. It is therefore possible to accurately press the outer circumferential surface of the sealing member against the facing surface.

The housing main body preferably includes a scroll member having an inner surface that defines a scroll space of the compressor housing and a shroud member having an outer circumferential surface, which defines the scroll space, and the facing surface.

An exhaust turbine supercharger is preferably provided that includes the above described compressor housing, and the supercharger preferably performs supercharging by rotating the compressor impeller using energy of exhaust gases.

DETAILED DESCRIPTION OF THE PREFERRED EMBODIMENTS

Figure 2A:
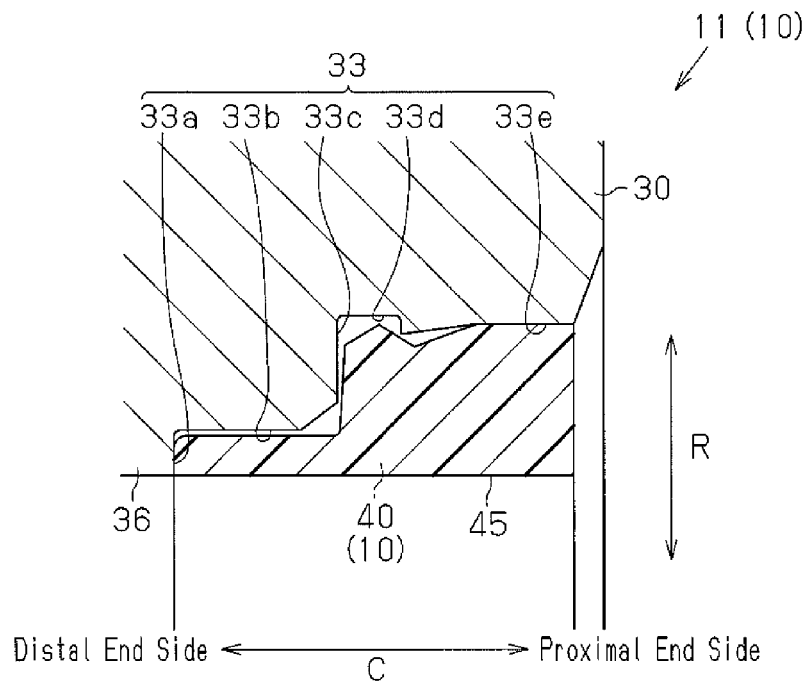
Figure 2B:
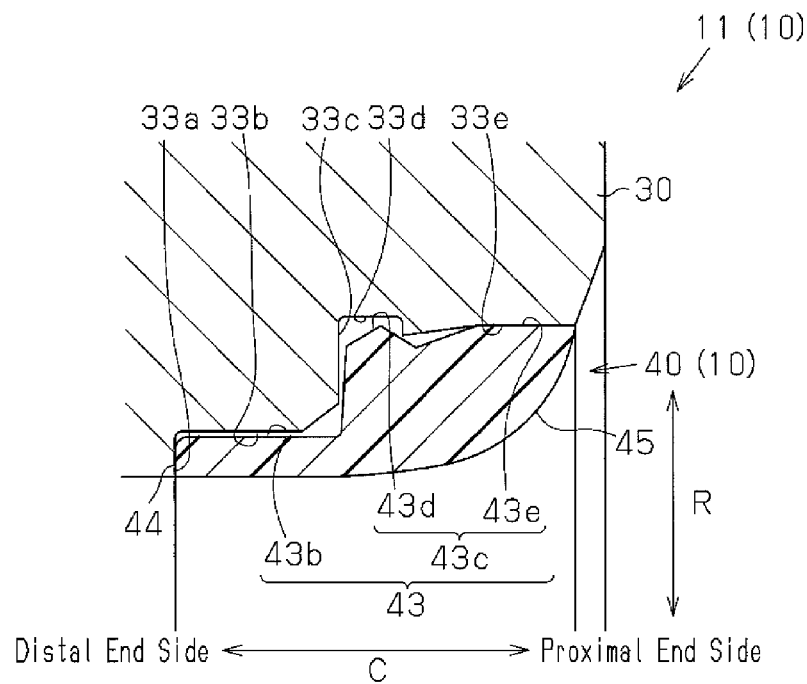

FIG. 1 is a cross-sectional view partially illustrating a cross-sectional structure of a compressor that forms an exhaust turbine supercharger according to one embodiment of the invention; and FIGS. 2(a) and 2(b) are enlarged cross-sectional views that mainly describe a facing surface of a shroud member and an outer circumferential surface of a sealing member in the embodiment, where FIG. 2(a) is a cross-sectional view before cutting, and FIG. 2(b) is a cross-sectional view after cutting.

MODES FOR CARRYING OUT THE INVENTION

Hereinafter, a compressor housing and an exhaust turbine supercharger according to one embodiment of the present invention will be described with reference to FIGS. 1 and 2.

FIG. 1 partially illustrates a cross-sectional structure of the compressor 2 that forms an exhaust turbine supercharger of the present embodiment (hereinafter, abbreviated as a supercharger 1).

Hereinafter, a right side in FIG. 1 in an axial direction C of the compressor impeller 3 is referred to as a proximal end side, and a left side in FIG. 1 is referred to as a distal end side. Furthermore, among surfaces of each portion of each member, a surface facing the distal end side is referred to as a distal end face, and a surface facing the proximal end side is referred to as a proximal end surface.

As illustrated in FIG. 1, the compressor 2 of the supercharger 1 is a centrifugal compressor, and includes a compressor impeller 3 and a compressor housing 10, which surrounds the compressor impeller 3.

The compressor housing 10 includes a housing main body 11 and a sealing member 40. The housing main body 11 is constituted by a scroll member 20 and a shroud member 30 and forms a housing of the compressor 2. The sealing member 40 is located on a facing surface 33, which is located radially outside of the compressor impeller 3 on the inner circumferential surface of the housing main body 11.

In the interior of the scroll member 20, a scroll portion 21 serving as an inner surface is formed which has a substantially circular cross-section and defines a spiral scroll space S as a whole.

The shroud member 30 has a substantially cylindrical shape. A scroll portion 31, which defines the scroll space S together with the scroll portion 21, is formed on the outer circumferential surface of the shroud member 30.

The facing surface 33 is formed on the inner circumferential surface of the shroud member 30. The facing surface 33 is located radially outside of the compressor impeller 3 and faces the compressor impeller 3. An extension portion 36 configured to support the inner circumferential surface of the scroll member 20 extends from the distal end of the facing surface 33.

The sealing member 40 has a substantially cylindrical shape, and is formed of a plastic material having a free-cutting property to the compressor impeller 3. That is, the inner circumferential surface (shroud surface) of the sealing member 40 functions as an abradable seal. The axial direction C of the sealing member 40 is the same as the axial direction C of the compressor impeller 3.

A method by which the sealing member 40 is fixed to the facing surface 33 will be described referring to FIG. 2.

FIG. 2 is an enlarged cross-sectional view that mainly describes the facing surface 33 of the shroud member 30 and the outer circumferential surface 43 of the sealing member 40. In addition, FIG. 2(a) is a cross-sectional view before the inner circumferential surface 45 of the sealing member 40 is cut, and FIG. 2(b) is a cross-sectional view after the inner circumferential surface 45 of the sealing member 40 is cut. Furthermore, FIGS. 2(a) and 2(b) are the same except that the shapes of the inner circumferential surface 45 of the sealing member 40 are different from each other.

As illustrated in FIG. 2(a), on the facing surface 33 of the shroud member 30, in order from the distal end side thereof, a distal end side stepped portion 33a, a distal end side enlarged-diameter portion 33b, a central stepped portion 33c, a recessed portion 33d, and a proximal end side enlarged-diameter portion 33e are formed.

The distal end side enlarged-diameter portion 33b has a larger diameter than the inner circumferential surface of the extension portion 36, and a step formed by the inner circumferential surface of the extension portion 36 and the distal end side enlarged-diameter portion 33b serves as the distal end side stepped portion 33a.

The proximal end side enlarged-diameter portion 33e is located at the proximal end of the inner circumferential surface 33, and has a larger diameter than the distal end side enlarged-diameter portion 33b.

The recessed portion 33d is located between the distal end side enlarged-diameter portion 33b and the proximal end side enlarged-diameter portion 33e in the axial direction C of the sealing member 40, and has a further enlarged diameter than the proximal end side enlarged-diameter portion 33e. A step formed by the distal end side enlarged-diameter portion 33b and the recessed portion 33d serves as the central stepped portion 33c. In addition, corners between the distal end side enlarged-diameter portion 33b and the central stepped portion 33c are chamfered.

As illustrated in FIG. 2B, on the outer circumferential surface 43 of the sealing member 40, in order from the distal end side thereof, a reduced-diameter portion 43b, and an enlarged-diameter portion 43c having a larger diameter than the reduced-diameter portion 43b are formed. The outer diameter of the reduced-diameter portion 43b is smaller than the inner diameter of the distal end side enlarged-diameter portion 33b of the facing surface 33.

The enlarged-diameter portion 43c is formed with a protruding portion 43d capable of being fitted to the recessed portion 33d of the facing surface 33, and a proximal end side enlarged-diameter portion 43e that is positioned on the proximal end side of the protruding portion 43d and is pressed against the proximal end side enlarged-diameter portion 33e of the facing surface 33. The maximum outer diameter of the protruding portion 43d is smaller than the inner diameter of the recessed portion 33d. In addition, the outer diameter of the enlarged-diameter portion 43c is formed to be larger than the inner diameter of the proximal end side enlarged-diameter portion 33e of the facing surface 33.

As collectively illustrated in FIGS. 2(a) and 2(b), the sealing member 40 is assembled by press-fitting the sealing member 40 toward the distal end side from the proximal end side to the facing surface 33 of the shroud member 30.

When the sealing member 40 is press-fitted to the facing surface 33, displacement of the distal end side of the sealing member 40, that is, displacement toward the leading side in the press-fitting direction is limited by the abutment of the sealing member 40 against the distal end side stepped portion 33a formed on the facing surface 33. At this time, a predetermined gap exists between the distal end face of the enlarged-diameter portion 43c of the sealing member 40 and the proximal end surface of the central stepped portion 33c of the facing surface 33 facing the distal end face. That is, on the facing surface 33, only the distal end side stepped portion 33a in the axial direction C of the sealing member 40 is in contact with the sealing member 40.

At this time, the protruding portion 43d of the sealing member 40 is fitted into the recessed portion 33d of the facing surface 33, and the outer circumferential surface of the proximal end side enlarged-diameter portion 43e of the sealing member 40 is pressed against the inner circumferential surface of the proximal end side enlarged-diameter portion 33e of the facing surface 33. A predetermined gap exists between the inner circumferential surface of the recessed portion 33d of the facing surface 33 and the outer circumferential surface of the protruding portion 43d of the sealing member 40. Also, a predetermined gap exists between the inner circumferential surface of the distal end side enlarged-diameter portion 33b and the outer circumferential surface of the reduced-diameter portion 43b. That is, on the facing surface 33, only the proximal end side enlarged-diameter portion 33e in the radial direction R of the sealing member 40 is in contact with the sealing member 40.

In addition, from the state (see FIG. 2(a)) where the sealing member 40 is press-fitted to the facing surface 33, as illustrated in FIG. 2(b), the inner circumferential surface 45 becomes a shape along the outer circumferential shape of the compressor impeller 3 by cutting the inner circumferential surface 45 of the sealing member 40.

Operation

Next, operation of the present embodiment will be described.

In such a supercharger 1, when a turbine wheel (not illustrated) is rotated and driven using the energy of exhaust gases emitted from an internal combustion engine, the compressor impeller 3 axially connected to the turbine wheel rotates. Thus, the intake air is compressed and supercharging is performed.

Furthermore, since the sealing member 40 is assembled by being press-fitted into the facing surface 33 of the housing main body 11 (the shroud member 30), it is possible to attach the sealing member 40 to the shroud member 30 without depending on another member such as a snap ring. In addition, unlike the case of forming the sealing member on the facing surface by the thermal spraying, or the case of forming the sealing member by the injection molding, it is possible to provide the sealing member 40 without heating the shroud member 30.

According to the compressor housing and the exhaust turbine supercharger according to the present embodiment described above, it is possible to obtain operational advantages described below.

(1) The sealing member 40 is press-fitted into the facing surface 33 of the shroud member 30 that forms the housing main body 11. According to such a configuration, it is possible to accurately attach the sealing member 40 to the facing surface 33 of the shroud member 30, without causing thermal distortion in the housing main body 11 (the shroud member 30), and without depending on another member.

(2) The protruding portion 43d is formed on the outer circumferential surface 43 of the sealing member 40. Furthermore, the recessed portion 33d, to which the protruding portion 43d is fitted, is formed on the facing surface 33 of the shroud member 30. According to such a configuration, since the protruding portion 43d formed on the outer circumferential surface 43 of the sealing member 40, and the recessed portion 33d facing the protruding portion 43d in the facing surface 33 of the shroud member 30 are fitted to each other, even in a case where the pressing state between the facing surface 33 of the shroud member 30 and the sealing member 40, which is obtained by the enlarged-diameter portion 43c pressed against the proximal end side enlarged-diameter portion 33e, is alleviated, it is possible to restrict the sealing member 40 from escaping the facing surface 33 of the shroud member 30.

(3) The protruding portion 43d of the sealing member 40 is positioned on the leading side in the press-fitting direction of the sealing member 40 in the axial direction C of the sealing member 40 relative to the proximal end side enlarged-diameter portion 43e, which is pressed against the facing surface 33 of the shroud member 30. According to such a configuration, between the outer circumferential surface 43 of the sealing member 40 and the facing surface 33 of the shroud member 30, a trailing portion in the press-fitting direction relative to the fitting position between the protruding portion 43d of the sealing member 40 and the recessed portion 33d of the shroud member 30 is sealed by pressing between the proximal end side enlarged-diameter portion 43e and the proximal end side enlarged-diameter portion 33e. For this reason, it is possible to reliably prevent water or the like from entering the fitting position from the trailing side in the press-fitting direction of the sealing member 40.

(4) A part located on the leading side in the press-fitting direction of the sealing member 40 relative to the proximal end side enlarged-diameter portion 33e on the facing surfaces 33 of the shroud member 30 is a distal end side stepped portion 33a protruded radially inwardly. Furthermore, position-determining of the sealing member 40 in the press-fitting direction (axial direction C) of the sealing member 40 is performed by the distal end side stepped portion 33a. According to such a configuration, when the sealing member 40 is press-fitted to the facing surface 33 of the shroud member 30, the sealing member 40 abuts against the distal end side stepped portion 33a formed on the facing surface 33. Thus, displacement of the sealing member 40 toward the leading side in the press-fitting direction is restricted. For this reason, it is possible to easily and accurately determine the position of the sealing member 40 relative to the facing surface 33. Moreover, since the distal end side stepped portion 33a and the sealing member 40 abut to each other, it is possible to reliably suppress the water or the like from entering between the facing surface 33 and the outer circumferential surface 43 of the sealing member 40 through between these portions.

(5) On the facing surface 33 of the shroud member 30, only the distal end side stepped portion 33a is in contact with the sealing member 40 in the axial direction C of the sealing member 40. According to such a configuration, when the sealing member 40 is press-fitted to the facing surface 33 of the shroud member 30, parts in the axial direction C other than the distal end side stepped portion 33a and the proximal end side enlarged-diameter portion 33e do not interfere with the sealing member 40. It is therefore possible to accurately perform the press-fitting and position-determining of the sealing member 40.

(6) On the facing surface 33 of the shroud member 30, only the proximal end side enlarged-diameter portion 33e in the radial direction R of the sealing member 40 is in contact with the sealing member 40 in the radial direction R. According to such a configuration, when the sealing member 40 is press-fitted to the facing surface 33 of the shroud member 30, parts in the radial direction R of the sealing member 40 other than the proximal end side enlarged-diameter portion 33e do not interfere with the sealing member 40. It is therefore possible to accurately press the outer circumferential surface 43 of the sealing member 40 against the facing surface 33.

(7) The sealing member 40 has a reduced-diameter portion 43b. According to such a configuration, it is possible to prevent the build of the sealing member 40 from increasing unnecessarily.

(8) A predetermined gap exists between the inner circumferential surface of the distal end side enlarged-diameter portion 33b of the facing surface 33 of the shroud member 30 and the outer circumferential surface of the reduced-diameter portion 43b of the sealing member 40. According to such a configuration, it is possible to accurately prevent the stress concentration from occurring in the reduced-diameter portion 43b with low rigidity.

Furthermore, the compressor housing and the exhaust turbine supercharger according to the invention are not limited to the configurations illustrated in the above embodiments, and may also be carried out, for example, as the following forms in which theses configurations are suitably modified.

In the above-mentioned embodiment, the sealing member 40 formed of a plastic material has been described as an example, but the invention is not limited thereto. The sealing member may be formed by weaker materials than the compressor impeller, for example, metallic materials as long as such a material has the free-cutting property to the compressor impeller.

In the above-mentioned embodiment, the description has been given of a case where the housing main body 11 is formed by the scroll member 20 and the shroud member 30, but the housing main body 11 may be formed by three or more members. Furthermore, the housing main body may also be formed by one member.

In the above-mentioned embodiment, the distal end side stepped portion 33a as a part of the facing surface 33 is the position-determining portion configured to determine the position of the sealing member 40 in the press-fitting direction of the sealing member 40. Alternatively, the position-determining portion may also be embodied by a separate member from the facing surface.

As in the above-mentioned embodiment, it is desirable to provide the position-determining portion configured to position the sealing member in the press-fitting direction of the sealing member, in order to easily and accurately determine the position of the sealing member against the facing surface. However, as long as the position of the sealing member can be accurately determined by other means, it is also possible to omit such a position-determining portion.

As in the above-mentioned embodiment, it is desirable that the protruding portion 43d in the axial direction C of the sealing member 40 be positioned on the leading side in the press-fitting direction of the sealing member 40 relative to the proximal end side enlarged-diameter portion 43e (pressing portion) to be pressed against the facing surface 33, that is, on the distal end side, in order to reliably prevent water or the like from entering between the protruding portion 43d and the recessed portion 33d from the proximal end side. However, when the infiltration of water or the like does cause a problem, the protruding portion in the axial direction of the sealing member may be formed on the proximal end side of the pressing portion.

In the above-mentioned embodiment, a configuration has been described in which the protruding portion 43d is formed on the outer circumferential surface 43 of the sealing member 40, and the recessed portion 33d is formed on the facing surface 33 of the shroud member 30. Alternatively, the recessed portion may be formed on the outer circumferential surface of the sealing member, and the protruding portion may be formed on the facing surface of the shroud member. Even in this case, it is possible to obtain the operational advantages according to the operational advantages (2) of the above embodiment.

As in the above-mentioned embodiment and a modified example thereof, it is desirable that the protruding portion or the recessed portion be formed on the outer circumferential surface of the sealing member, the recessed portion or the protruding portion be formed on the facing surface of the housing main body, and these portions be fitted together, in order to prevent the sealing member from escaping the housing main body. However, when such escaping does not any problem, the protruding portion (recessed portions) and the recessed portion (protruding portion) may be omitted.

DESCRIPTION OF THE REFERENCE NUMERALS

1 . . . supercharger, 2 . . . compressor, 3 . . . compressor impeller, 10 . . . compressor housing, 11 . . . housing main body, 20 . . . scroll member, 21 . . . scroll portion, 30 . . . shroud member 31 . . . scroll portion, 33 . . . facing surface, 33a . . . distal end side stepped portion (position-determining portion, step portion), 33b . . . distal end side enlarged-diameter portion, 33c . . . central stepped portion, 33d . . . recessed portion, 33e . . . proximal side enlarged-diameter portion (pressing portion), 36 . . . extension portion, 40 . . . sealing member, 43 . . . outer circumferential surface, 43b . . . reduced-diameter portion, 43c . . . enlarged-diameter portion, 43d . . . protruding portion, 43e . . . proximal side enlarged-diameter portion (pressing portion), 44 . . . leading end portion, 45 . . . inner circumferential surface.

The invention claimed is:

1. A compressor housing comprising:
a housing main body that surrounds a compressor impeller, the housing main body having a facing surface that is located at a position on a radially outside of the compressor impeller on an inner circumferential surface of the housing main body and faces the compressor impeller; and
a cylindrical sealing member that is arranged on the facing surface and is formed by a material having a free-cutting property to the compressor impeller,
wherein
the sealing member is press-fitted to the facing surface of the housing main body from a side corresponding to a proximal end of the compressor impeller,
the sealing member has a reduced-diameter portion formed on a leading side in a press-fitting direction of the sealing member and an enlarged-diameter portion, which is located on a trailing side in the press-fitting direction relative to the reduced-diameter portion and has a larger outer diameter than the reduced-diameter portion,
the enlarged-diameter portion includes a pressing portion that is pressed against the facing surface of the housing main body in the radial direction of the sealing member,
a stepped portion is formed by projecting, radially inwardly, a part of the facing surface of the housing main body,
a position of the sealing member in the press-fitting direction is determined by causing a distal end face on the leading side in the press-fitting direction of the reduced-diameter portion against the stepped portion, and
only the pressing portion of the enlarged-diameter portion of the sealing member comes into contact with the facing surface of the housing main body in the radial direction of the sealing member.

2. The compressor housing according to claim 1, wherein
a protruding portion is formed on the outer circumferential surface of the enlarged diameter portion of the sealing member, and
a recessed portion, with which the protruding portion of the sealing member is fitted, is formed on the facing surface of the housing main body.

3. The compressor housing according to claim 2, wherein the protruding portion of the sealing member is located on the leading side in the press-fitting direction relative to the pressing portion.

4. The compressor housing according to claim 1, wherein only the distal end face of the reduced-diameter portion of the sealing member comes into contact with the facing surface of the housing main body in the axial direction of the sealing member.

5. The compressor housing according to claim 1, wherein the housing main body includes a scroll member having an inner surface that defines a scroll space of the compressor housing and a shroud member having an outer circumferential surface, which defines the scroll space, and the facing surface.

6. An exhaust turbine supercharger comprising the compressor housing according to claim 1, wherein the supercharger performs supercharging by rotating the compressor impeller using energy of exhaust gases.

7. The compressor housing according to claim 1, wherein
a recessed portion is formed on the outer circumferential surface of the enlarged diameter portion of the sealing member, and
a protruding portion, with which the recessed portion of the sealing member is fitted, is formed on the facing surface of the housing main body.

8. The compressor housing according to claim 7, wherein the recessed portion of the sealing member is located on the leading side in the press-fitting direction relative to the pressing portion.

* * * * *